United States Patent [19]
Jibiki

[11] Patent Number: 5,764,410
[45] Date of Patent: Jun. 9, 1998

[54] TELESCOPE INCLUDING AN INTERPOSITION GEAR FOR ZOOM OPERATION

[75] Inventor: Ubao Jibiki, Kawasaki, Japan

[73] Assignee: Hakko Co., Ltd., Tokyo, Japan

[21] Appl. No.: 658,380

[22] Filed: Jun. 5, 1996

[51] Int. Cl.$^6$ ............................ G02B 23/00; G02B 15/14

[52] U.S. Cl. .................................. 359/422; 359/700

[58] Field of Search ........................ 359/422, 425, 359/426, 432, 700, 701, 825, 826

[56] References Cited

U.S. PATENT DOCUMENTS

| | | | |
|---|---|---|---|
| 3,896,466 | 7/1975 | Korpert | 354/196 |
| 4,952,041 | 8/1990 | Sandall | 359/422 |
| 5,218,479 | 6/1993 | Chiou et al. | 359/700 |
| 5,388,005 | 2/1995 | Wilson | 359/694 |
| 5,532,883 | 7/1996 | Fukino | 359/825 |

Primary Examiner—Paul M. Dzierzynski
Assistant Examiner—Mark A. Robinson
Attorney, Agent, or Firm—Stephen Donovan

[57] ABSTRACT

An improved zoom telescope which has a freely rotatable annular zoom ring connected through an interposition gear to a cam cylinder.

9 Claims, 4 Drawing Sheets

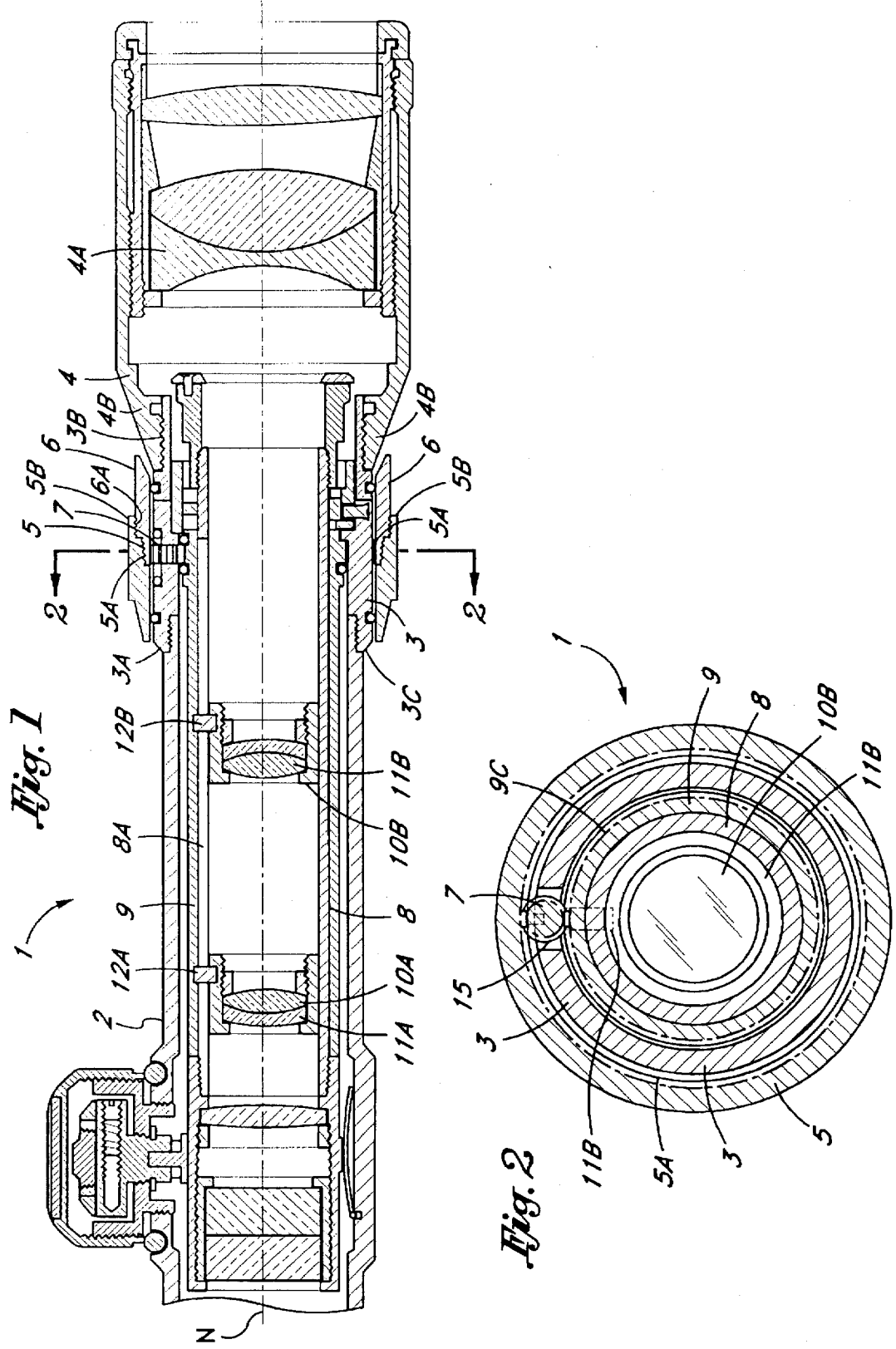

TELESCOPE INCLUDING AN INTERPOSITION GEAR FOR ZOOM OPERATION

BACKGROUND

The present invention relates to an improved zoom telescope. In particular the present invention relates to a new gear drive system for a zoom telescope.

A telescope is an optical device comprising a longitudinal housing in which several lenses are disposed. A telescope includes a spotting or sighting scope such as a scope for attachment to or use in conjunction with a firearm as by attaching the scope to the top of a rifle, pistol or revolver.

A zoom telescope is a telescope in which the magnification of an object viewed can be adjusted (increased or decreased) by the in tandem or coordinated movement of two additional lenses (the zoom group lenses) disposed within a cylindrical tube placed within the housing of the telescope. The cylindrical tube containing the zoom group lenses is placed in the optical or focal path of light (or other radiation) which enters the telescope at a forward end of the telescope and leaves the telescope at a rear end of the telescope, passing then to an eye of a user or to another light receiving device.

An Existing Zoom Telescope

An example of a known zoom telescope 50 is shown in FIGS. 4, 5 and 6. The known zoom telescope 50 has an annular zoom ring 51 mounted on the outside of a housing 52. The annular zoom ring can be rotated about the outside of the housing. Rotation of the annular zoom ring 51 about the outside of the housing 52 is limited to a rotation of certain maximum angular distance around the housing 52. A screw 53 is used to connect the annular zoom ring 51 and to a cam cylinder 54. The cam cylinder 54 is disposed within the housing 52.

In the known zoom telescope 50 the zoom function is carried out by rotating the annular zoom ring 51 thereby rotating the cam cylinder 54.

The known zoom telescope 50 has an circular-shaped or bezel opening 55 in the housing 52. The bezel opening 55 is cut in and extends through about 300 degrees of arc (or less) (out of a possible 360 degrees) of the housing 52, as shown by FIG. 5. The bezel opening 55 functions as a guide pass for the screw 53. The screw 53 connects the annular zoom ring 51 to the cam cylinder 54.

The bezel opening 55 of the known zoom telescope 50 is positioned behind a lens 56B of a zooming group lens 56 and in front of an eyepiece lens 57. The bezel opening 55 is also aligned perpendicular (when viewed in cross-section as shown in FIG. 5) to an optical axis 62 of the known zoom telescope 50.

Two screw-shaped grooves (not shown) in the cam cylinder 54 are inclined in a direction toward the optical axis 62. Rotation of the annular zoom ring 51 is transmitted through the screw 53 to cause rotation of the cam cylinder 54. An internal cylinder 58 is to located inside the cam cylinder 54. Rotation of the cam cylinder 54 causes a longitudinal movement of the internal cylinder 58 and hence also causes a longitudinal movement of the zooming group lenses 56A and 56B which are located within the inner cylinder 58. The internal cylinder 58 has a linear guide groove 59 which permits lens 56A and lens 56B of the zoom group 56 to move forward and back along the linear guide groove 59 as the internal cylinder 58 is urged to move by rotation of the cam cylinder. Thus, rotation of the annular zoom ring 51 causes the screw 53 to move in the screw-shaped groves causing the cam cylinder 54 to rotate. In turn, rotation of the cam cylinder 54 causes the lenses 56A and 56B to move along the linear guide groves and therefore along the optical axis 62 due to movement of the inner cylinder 58. Thus, the lens 56A and 56B of the zoom group 56 are designed to move along the optical axis 62 as the the internal cylinder 58 is moved.

Pin 61A and 61B in respective supporters 60A and 60B permit the respective lens 56A and 56B of the zoom group 56 to move inside the internal cylinder 58 along the linear guide grooves. The pins 61A and 61B are inserted to pass between two overlapped parts in the two screw-shaped grooves and the linear guide grooves 59. With this mechanism in the known zoom telescope 50, rotation of the annular zoom ring 51 causes rotation of cam cylinder 54 and hence the zoom function as the two lens 56A and 56B are moved forward and back along the linear guide grooves 59 within the optical path 62.

As explained, the known zoom telescope 50 must have a circular arc-shaped bezel opening 55 on the housing 52. The bezel opening permits transmittal of the rotation of the annular zoom ring 51 located outside the housing 52 to the cam cylinder 54 inside the housing 52. The bezel opening 55 can be a wide-angle (up to about 300 degrees of arc) circular arc-shaped opening having the optical axis 62 of the known zoom telescope 50 as its central longitudinal axis.

The bezel opening 55 is positioned between lens 56B of the the zooming group lens 56B and an eyepiece lens 57. The eyepiece lens 57 has a threaded forward end 57A which screws into a threaded rear end 52A (see FIG. 4) of the housing 52. The threaded rear end 52A of the housing 52 is located between the annular zoom ring 51 and the eyepiece 57.

The bezel opening 55 is positioned so as to be intersected by the optical axis 62. It should be noted that the bezel opening cuts through almost the entire housing 52, as shown by FIG. 5, so as to permit an effective rotation of the annular zoom ring 51 and hence the carrying out of the desired zoom function.

A serious problem can occur when the housing 52 of the known zoom telescope 50 is struck or knocked because the bezel opening forms a weak point in the longitudinal housing 52. Thus, the housing 52 is inherently more likely to be deformed at this location (where the bezel opening 55 exists) when under influence of an externally applied force. A geometric distortion to the optical axis 62 can result because of a deformation or displacement of the lenses of the zooming group 56 and/or the eyepiece lens 57 upon an application of a force (such as by dropping or knocking the known zoom telescope 50) to the housing 52 at the location of the bezel opening 55. This occurs because the housing 52 becomes deformed at the bezel opening 55 or because the external force is transmitted through the bezel opening to the sensitive internal and carefully positioned lenses.

Unfortunately, any distortion of the lenses of the known zoom telescope 50 affects the ability to focus on an object to be viewed by the telescope 50.

A further problem with the known zoom telescope 50 occurs because the amount of the rotation of the annular zoom ring 51 (and therefore also the amount of the rotation of the cam cylinder 54) is limited to about 300 degree (or less) due to the extent of the angular distance of the bezel opening 55. If the bezel opening 55 were extended beyond about 300 degrees of arc and unacceptable weakness in the structure of the housing 52 would result. The limitation in rotation of the annular zoom ring 51 limits the distance by which the zooming group lenses 52A and 52B can be moved along the linear guide groove 59 and thereby limits the amount of zoom magnification which can be obtained.

With the known zoom telescope 50, it therefore becomes necessary to reduce the angle in relation to the optical axis 62 of the screw-shaped groove in order to obtain a desired zoom magnification. Reducing the angle of the screw shaped grooves in the cam cylinder 54 increases the distance that the screw 53 travels in the screw shaped grooves (as the annular zoom ring 51 is rotated) thereby increasing the distance travelled by the zooming group lenses 56A and 56B along the optical path 62. Unfortunately, reducing the angle of the screw-shaped grooves makes it harder to turn the annular zoom ring 51. Hence a higher torque must be applied to rotate the annular ring 51. The higher required torque can cause the screw 53 to grind into the screw-shaped grooves eventually causing the screw 53 to slip out of the screw-shaped grooves. Additionally, the higher required torque can cause the narrow strip of housing at the bezel opening 55 location to become deformed resulting in an inability to focus.

What is needed therefore is a zoom telescope which has a strengthened housing and which does not require application of a high torque to obtain a desired zoom magnification.

SUMMARY

The present invention meets this need and provides a zoom telescope with a more stable and strengthened housing thereby retaining a stable focusing upon application of an external shock or force to the housing. The present invention also provides a zoom telescope which does not require a high torque to obtain a zoom magnification.

A preferred embodiment of the present invention can comprise a zoom telescope with six parts. These parts are firstly a housing that has a front end and a threaded rear end. Second, a cylindrical body with a threaded front end and a threaded rear end. The threaded front end of the cylindrical body mates with the threaded rear end of the cylindrical housing to attach the housing to the cylindrical body. The cylindrical body has a hole for receiving an interposition gear. Third, an eyepiece with a threaded front end and a rear end. The threaded rear end of the cylindrical body can mate with the threaded front end of the eyepiece to thereby attach the eyepiece to the cylindrical body. Fourth, a freely rotatable annular zoom ring mounted on an outside surface of the cylindrical body. The annular zoom ring can have an annular ring gear disposed on an inner surface of the annular zoom ring. Fifth, a cam cylinder which has a moveable or zoom lens disposed within the cam cylinder. The cam cylinder also has a circular shaped gear on an outer surface of the cam cylinder. Sixth, a toothed, rotatable and circular interposition gear mounted in the hole in the cylindrical body in a manner so that one or more of the teeth of the interposition gear extends above the outer surface and one or more of the teeth of the interposition gear extend below an inner surface of the cylindrical body. In this manner, the teeth of the interposition gear which extend above the outer surface of the cylindrical body can contact and interact with the annular ring gear on the inner surface of the annular zoom ring. The teeth of the interposition gear which extend below the inner surface of the cylindrical body contact and interact with the circular shaped gear on the outer surface of the cam cylinder. Rotation of the annular zoom ring is transmitted through the interposition gear to the cam cylinder to thereby move the zoom lens along an optical axis of the zoom telescope resulting in the zoom function.

The annular zoom ring of disclosed zoom telescope can be rotated through an angle greater than about 300 degrees.

Preferably, the annular zoom ring can be rotated through an angle greater than about 360 degrees.

The zoom telescope can also have an inner cylinder disposed within the cam cylinder. The zoom telescope can additionally have a screw-shaped cam groove on the surface of the cam cylinder in which screw-shaped cam groove a bottom end of the interposition gear rests.

The zoom telescope can also have an inner cylinder into which the cam cylinder is inserted such that the inner cylinder is freely rotatable on the cam cylinder.

The annular ring of zoom telescope can have a threaded rear end and the zoom telescope can comprise a ring-shaped body with a threaded front end. The threaded rear end of the annular zoom ring and the threaded front end of the ring-shaped body can mate and are screwed to each other.

An additional preferred embodiment of the present invention can be a sighting telescope with a zoom mechanism, the zoom mechanism comprising: a housing; an annular zoom ring on the outer surface of the housing of the telescope rotating freely about it; an annular ring-shaped gear mounted on the inner surface of the annular zoom ring; (c) a circular shaped gear mounted on outer surface of the cam cylinder in such a way to rotate freely within the housing, and; a zoom mechanism having an interposition gear interposed between the annular ring-shaped gear and the circular (shaped) gear.

In the disclosed sighting telescope the interposition gear can mounted on a cam cylinder with (the latter) connected to the aforementioned housing in such a way to rotate freely. The annular zoom ring can be connected to this cylinder in such a way to rotate freely about the housing. The interposition gear can be interposed between the annular ring-shaped gear and the circular (shaped) gear.

DRAWINGS

These and other features, aspects, and advantages of the present invention can become better understood from the following description, claims and the accompanying drawings where:

FIG. 1 is a partial cross-sectional side view of an embodiment of a zoom telescope within the scope of present invention.

FIG. 2 is the front cross-sectional view along taken along the line 2—2 in FIG. 1.

DESCRIPTION

Figure 3:
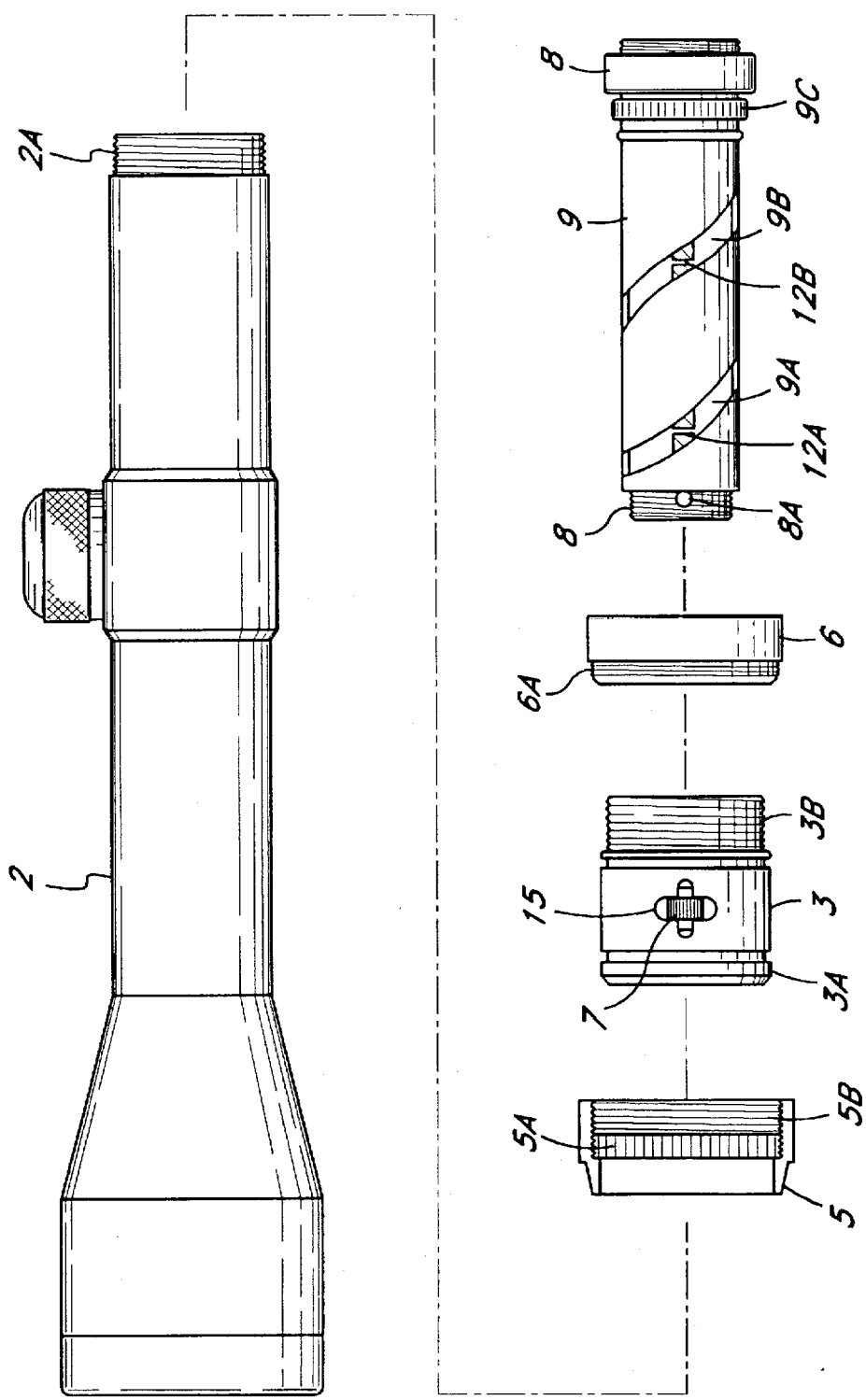
FIG. 3 is an exploded view of the zoom mechanism of the zoom telescope shown in FIG. 1.
Figure 4:
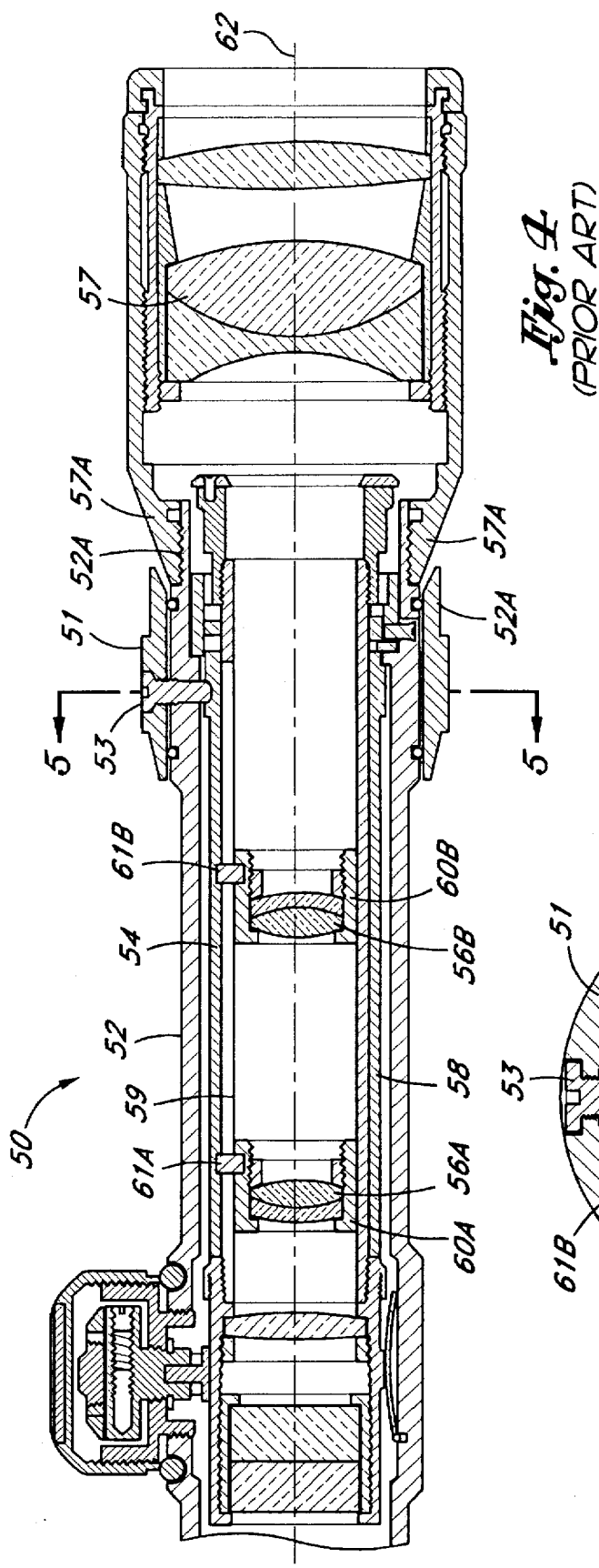
FIG. 4 is a partial cross-sectional side view of a known zoom telescope.
Figure 5:
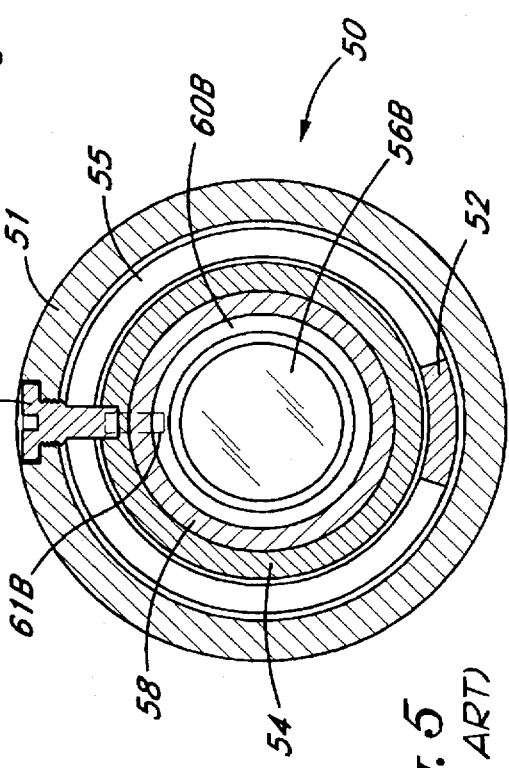
FIG. 5 is a front cross-sectional view taken along the line 5—5 in FIG. 4.
Figure 6:
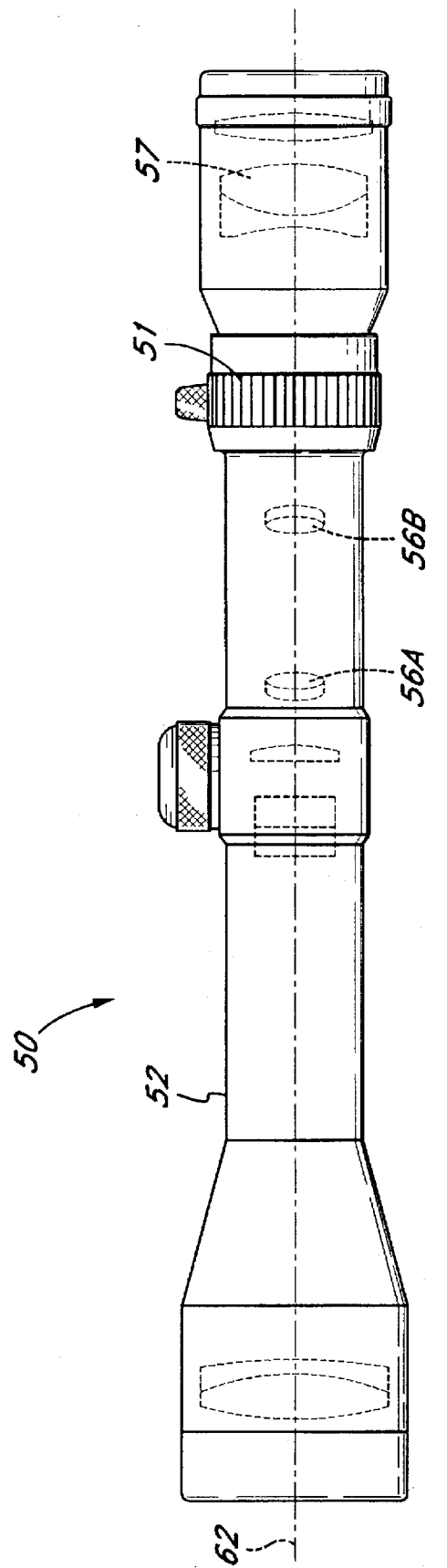
FIG. 6 is a perspective view of the known zoom telescope shown in FIG. 4.

The present invention is based upon the discovery that the bezel opening can be entirely dispensed with through use of an interposition gear.

The present invention is a zoom telescope of which an embodiment can comprise: (a) a zoom telescope housing 2; (b) an annular zoom ring 5. The annular zoom ring 5 is mounted on the outside of the housing 2. The annular zoom ring 5 can freely rotate, that is it can rotate by more than 360 degrees of arc, when mounted on the outside of a housing 2. The annular zoom ring 5 has an annular ring-shaped gear 5A mounted or formed or cut on or into the inner surface of the annular zoom ring 5. The annular zoom ring 5 also has a threaded rear end 5B; (c) a ring shaped body 6; (d) a cam cylinder 9. The cam cylinder 9 has a circular-shaped gear 9C mounted on or cut into the outer surface of the cam cylinder 9 so that the cam cylinder 9 can freely rotate freely within the housing 2; (f) an interposition gear 7 interposed or placed between the annular ring-shaped gear 5A on the inner surface of the annular zoom ring 5 and the outer circular-shaped gear 9C on the outer surface of the cam cylinder 9, and; (g) an inner cylinder 8 which holds the zooming lenses 10A and 10B and which inner cylinder is inserted into the cam cylinder 9.

The present zoom telescope differs from the known zoom telescope 50 in many different structural and functional ways. For example, a zoom telescope within the scope of the present invention entirely lacks the bezel opening 55 in the housing. The lack of a bezel opening results in (1) a much stronger housing so that an external impulse or shock applied to the housing or to the eyepiece lens not being intensified but is uniformly dispersed over the housing, and (2) the deflection of the optical axis of the lenses of the zooming group and of the eyepiece by an external disturbances is avoided, thereby allowing a stable focusing to be maintained.

Since the rotation of the annular zoom ring is transmitted to the cam cylinder via an interposition gear, the degree of the rotation of the annular zoom ring is unlimited. Therefore, the angle of the screw-shaped cam grooves (on the surface of the cam cylinder) relative to the optical axis can be a steep angle to move the zoom lens of the zooming group the required distance along the optical axis. In this way, the annular zoom ring can be rotated with a low torque application.

An embodiment of a zoom telescope within the scope of the present invention is illustrated by FIGS. 1–3. The zoom telescope 1 comprises: (a) a housing 2 threaded at a rear end 2A; (b) a cylindrical body 3 threaded at a forward end 3A with threads that mesh with the threads at the rear end 2A of the housing 2; (c) an annular zoom ring 5 which is attached to the cylindrical body 3 in such a way as to be able to freely rotatable. The annular zoom ring 5 is threaded at a rear end 5B; (d) a ring-shaped body 6 threaded at a front end 6A. The threads at the rear end 5B of the annular zoom ring and the threads at the forward end 6A of the ring-shaped body 6 are constructed to intersect and mesh with each other; (e) an eyepiece 4 which is threaded at a forward end 4B with threads that mesh with the threads 3B) at a rear end of the cylindrical body 3, thereby connecting the eyepiece 4 to the cylindrical body 3.

Small cross-hatched grooves 15 are cut on an outer surface of the cylindrical body 3. (f) An interposition gear 7 holds the shaft of the annular zoom ring 5 parallel to the optical axis of the zoom telescope 1 in the grooves 15 so that the annular zoom ring can be freely rotated. The interposition gear extends through the cylindrical body so that some of the teeth of the interposition gear 7 project slightly beyond the outer surface of the cylindrical body 3 and beyond the inner surface of the cylindrical body 3.

An annular zoom ring gear 5A is mounted on the inner surface or circumference of the annular zoom ring 5 and meshes with the interposition gear 7 mounted to the cylindrical body 3.

An internal cylinder 8 is inserted within the cam cylinder 9. The cam cylinder attached to the internal cylinder 8 is slideably inserted into the housing 2. The cam cylinder can rotate freely within the housing 2.

Thus the internal cylinder 8 is to located inside the cam cylinder 9. Rotation of the cam cylinder 9 causes a longitudinal movement of the internal cylinder 8 and hence also causes a longitudinal movement of the zooming group lenses 10A and 10B which are located within the inner cylinder 8. The internal cylinder 8 has a linear guide groove 8A which permits lens 10A and 10B of the zoom group lenses to move forward and back along the linear guide groove 8A as the internal cylinder 8 is urged to move by rotation of the cam cylinder. Thus, rotation of the annular zoom ring 5 causes the interposition gear 7 mesh with the gear 9C causing the cam cylinder 9 to rotate. In turn, rotation of the cam cylinder 9 causes the lenses 10A and 10B to move along the linear guide grove and therefore along the optical axis N due to movement of the inner cylinder 8. Thus, the lens 10A and 10B of the zoom group lenses are designed to move along the optical axis N as the internal cylinder 8 is moved.

A circular shaped gear 9C is mounted on the outside of a rear end of the cam cylinder 9 and meshes with the teeth of the interposition gear 7 which is mounted in the cylindrical body 3.

Two screw-shaped grooves 9A and 9B are cut into the outside surface of the cam cylinder 9 at only a slightly steep angle to optical axis N.

The lenses of the zooming group 10A and 10B of the zoom telescope 1 are mounted in the inner cylinder 8 in such a way as to rotate freely upon their respective supports 11A and 11B.

The screw 12A of the support 11A is inserted so as to pass as far as the point where the screw-shaped groove 9A and the inner cylinder 8 overlap with the guide groove 8A set parallel to the optical axis N. Thus, the screw 12A is inserted to pass as far as the point where the cam hole 9A overlaps with the guide groove 8A.

FIG. 3 is a disassembled drawing of the zoom mechanism of the zoom telescope 1. The order of assembly of the zoom mechanism is as follows: first, insert the annular zoom ring 5 into the screw threaded rear end 2A of the housing 2; second, slip the annular zoom ring 5 over the end of the outer surface of the housing 2; third, mesh the screw threaded front end 3C of the cylindrical body 3 to the screw threaded rear end 2A of the housing 2, thereby securing the cylindrical body to the housing 2; fourth connect the cylindrical body 3 to the housing 2.

By this point in the assembly, the interposition gear 7 is mounted in the small hole 15 in the cylindrical body in such a way as to rotate freely and to mesh with the teeth of the annular ring-shaped gear 5A mounted to the inner surface of the annular zoom ring 5.

Fifth, insert the gear of the annular ring-shaped body for fitting 6 between the inner surface with the gear 5B of the annular zoom ring 5 and the outer surface of the cylindrical body 3. Sixth mesh the gear 6A of the ring-shaped body for fitting 6 with the gear 5B of the annular zoom ring 5 to secure the ring-shaped body for fitting 6 to the annular zoom ring.

At this point in the assembly, the annular zoom ring 5 is mounted on the outside of the housing 2 in such a way as to freely rotatable. Rotation of the annular zoom ring 5 is transmitted to the interposition gear 7.

Seventh (as shown by FIG. 3), insert the inner cylinder 8 containing the pre-positioned lenses 10A and 10B of the zooming group in such a way that the inner cylinder 8 is freely rotatable about the optical axis N and the cam cylinder 9 within the housing 2. The inner cylinder 8 is inserted to and abuts against the edge of the threaded rear end of the cylindrical body 3.

Eighth, mount the inner cylinder 8 to the inside of the housing 2. At this point, the circular shaped gear 9C on the inside of the end of the cam cylinder 9 meshes with the interposition gear 7. Thereby completing the assembly of the zoom mechanism of the zoom telescope 1.

The screw threaded rear end 3B of the cylindrical body 3 is made to accept the threads of the threaded forward end 4B of the eyepiece 4.

With the zooming mechanism thus assembled rotation of the annular zoom ring 5 is transmitted to the cam cylinder 9 via the interposition gear 7. Additionally, rotation of the cam cylinder 9 is converted into a lateral movement parallel to the optical axis of inner cylinder 8 containing the zoom lenses 10A and 10B of the zooming group via the screw threaded shafts 12A and 12B and the support 11A and 11B, thereby operating the zoom function of the zoom telescope 1.

Furthermore, since the rotation angle of the annular zoom ring 5 has no limit, the grooves 9A and 9B of the cam cylinder 9 can be aligned with the optical axis N even in a sharply inclined angle. Therefore, the annular zoom ring 5 can be easily turned using a low torque.

With the above-described invention there is no transmition of force (such as due to a shock or impulse applied to the outside of the housing 2) to the lenses 10A or 10B of the zooming group or to the eyepiece lens 4A. The small mounting hole 15 for the interposition gear 7 in the cylindrical body 3 causes only a nominal force absorption.

Therefore, the zoom telescope 1 remains stable during normal operation and uninfluenced by external force applications.

The present invention provides a sighting telescope of which the zoom mechanism allows low-torque zooming as well as stable focusing accuracy. As a result, zooming is made easy with improved focusing accuracy on a targeted object.

Although the present invention has been described in detail with regard to certain preferred methods, other embodiments, versions, and modifications within the scope of the present invention are possible. For example, the described and claimed zoom mechanism can be effectuated by attaching a drive motor to the annular zoom ring.

Accordingly, the spirit and scope of the following claims should not be limited to the descriptions of the preferred embodiments set forth above.

I claim:

1. A zoom telescope comprising:

(a) a housing with a front end and a threaded rear end;

(b) a cylindrical body with a threaded front end and a threaded rear end, whereby the threaded front end of the cylindrical body mates with the threaded rear end of the housing, thereby attaching the housing to the cylindrical body, the cylindrical body having a hole for receiving an interposition gear;

(c) an eyepiece with a threaded front end and a rear end, the threaded rear end of the cylindrical body mating with the threaded front end of the eyepiece, thereby attaching the eyepiece to the cylindrical body;

(d) a freely rotatable annular zoom ring mounted on an outside surface of the cylindrical body, the annular zoom ring having an annular ring gear disposed on an inner surface of the annular zoom ring;

(e) a cam cylinder having a moveable or zoom lens disposed within the cam cylinder, the cam cylinder also having a circular shaped gear on an outer surface of the cam cylinder, (f) a toothed, rotatable and circular interposition gear mounted in the hole in the cylindrical body in a manner so that one or more of the teeth of the interposition gear extends above the outer surface and one or more of the teeth of the interposition gear extend below an inner surface of the cylindrical body, whereby the teeth of the interposition gear which extend above the outer surface of the cylindrical body can contact and interact with the annular ring gear on the inner surface of the annular zoom ring, and whereby the teeth of the interposition gear which extend below the inner surface of the cylindrical body can contact and interact with the circular shaped gear on the outer surface of the cam cylinder, (g) means for converting rotation of the cam cylinder into linear movement of the zoom lens within the cam cylinder, whereby rotation of the annular zoom ring is transmitted through the interposition gear to the cam cylinder thereby moving the zoom lens along an optical axis of the zoom telescope resulting in the zoom function.

2. The zoom telescope of claim 1, wherein the annular zoom ring can be rotated through an angle greater than about 300 degrees.

3. The zoom telescope of claim 2, wherein the annular zoom ring can be rotated through an angle greater than about 360 degrees.

4. The zoom telescope of claim 3, further comprising an inner cylinder disposed within the cam cylinder.

5. The zoom telescope of claim 4, further comprising a screw-shaped cam groove on the surface of the cam cylinder in which screw-shaped cam groove a bottom end of the interposition gear rests.

6. The zoom telescope of claim 5, further comprising an inner cylinder into which the cam cylinder is inserted such that the inner cylinder is freely rotatable on the cam cylinder.

7. The zoom telescope of claim 6, wherein the annular zoom ring has a threaded rear end, the zoom telescope further comprising a ring-shaped body with a threaded front end, whereby the threaded rear end of the annular zoom ring and the threaded front end of the ring-shaped body mate and are screwed to each other.

8. A sighting telescope which has a zoom mechanism, the zoom mechanism comprising:

(a) housing;

(b) an annular zoom ring mounted on and freely rotatable on an outer surface of the housing;

(c) an annular ring-shaped gear mounted on an inner surface of the annular zoom ring;

(d) a circular shaped gear mounted on an outer surface of a cam cylinder in such a way to rotate freely within the housing, (e) an interposition gear interposed between the annular ring-shaped gear and the circular shaped gear and;

(f) means for converting rotation of the cam cylinder into linear movement of a zoom lens disposed within the cam cylinder, whereby rotation of the annular zoom ring is transmitted through the interposition gear to the cam cylinder thereby moving the zoom lens along an optical axis of the sighting telescope resulting in a zoom function.

9. The sighting telescope of claim 8, wherein:
(a) the interposition gear is mounted on the cam cylinder and the cam cylinder is connected to the housing in such a way to rotate freely;
(b) the annular zoom ring is connected to the cam cylinder through the interposition gear and the annular zoom ring is freely rotatable about the housing, and;
(c) the interposition gear is interposed between and in contact with the annular ring-shaped gear of the annular zoom ring and with the circular shaped gear of the cam cylinder, whereby movement of the annular zoom ring is transmitted to the cam cylinder through the interposition gear.

* * * * *